United States Patent
Burgstahler et al.

(10) Patent No.: US 7,492,118 B2
(45) Date of Patent: Feb. 17, 2009

(54) METHOD AND DRIVE SYSTEM FOR OPERATING A SYNCHRONOUS MOTOR

(75) Inventors: Ralph Burgstahler, Erlangen (DE); Michael Klaus, Lutherstadt Wittenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/637,458

(22) Filed: Dec. 12, 2006

(65) Prior Publication Data

US 2008/0106230 A1    May 8, 2008

(51) Int. Cl.
*H02P 6/00* (2006.01)
(52) U.S. Cl. ........................................ 318/721; 702/151
(58) Field of Classification Search ................ 318/721; 702/151
See application file for complete search history.

(56) References Cited

U.S. PATENT DOCUMENTS

| | | | | |
|---|---|---|---|---|
| 5,782,609 | A * | 7/1998 | Ikemoto et al. | 417/44.1 |
| 6,021,888 | A * | 2/2000 | Itoh et al. | 198/783 |
| 6,163,127 | A * | 12/2000 | Patel et al. | 318/700 |
| 6,731,094 | B1 * | 5/2004 | Itoh et al. | 318/727 |
| 6,737,778 | B2 * | 5/2004 | Daikoku et al. | 310/112 |
| 7,024,332 | B2 * | 4/2006 | Kunzel et al. | 702/151 |
| 7,047,150 | B2 * | 5/2006 | Nemeth-Csoka et al. | 318/400.02 |
| 7,176,648 | B2 * | 2/2007 | Choi | 318/625 |
| 7,221,152 | B2 * | 5/2007 | Piippo | 324/207.25 |
| 7,312,595 | B2 * | 12/2007 | Kamio et al. | 318/701 |
| 2006/0125431 | A1 * | 6/2006 | Dornhof | 318/85 |
| 2007/0013325 | A1 * | 1/2007 | Kiuchi et al. | 318/34 |

FOREIGN PATENT DOCUMENTS

| | | |
|---|---|---|
| DE | 100 37 936 A1 | 1/2002 |
| DE | 101 96 894 T5 | 3/2003 |
| DE | 10 2005 023 202 A1 | 9/2006 |

OTHER PUBLICATIONS

J. Glasl, B. Wittmann, "Feldorientierte Regelung der Permanentmagnet-Synchronmaschine auf Basis des Drehzahlistwertes mit Winkelfehlerkorrektur" Electro-Technology and Information Technology (e&i), Jan. 2003, pp. 37-41, No. 1., 120.Jahrgang.

* cited by examiner

*Primary Examiner*—Walter Benson
*Assistant Examiner*—Antony M Paul

(57) ABSTRACT

In one aspect a method for operating a synchronous motor is provided. The method includes the following:
Determining an electrical angle of rotation on the basis of a speed, with the synchronous motor being controlled according to the electrical angle of rotation,
Determining a position of a rotor of the synchronous motor on the basis of the electrical angle or rotation and
Determining the speed on the basis of the position of the rotor.

In an other aspect a drive system and a machine are provided. The machine has a plurality of synchronous motors with stator windings used to generate electrical poles. The drive system operates the synchronous motors synchronously.

8 Claims, 2 Drawing Sheets

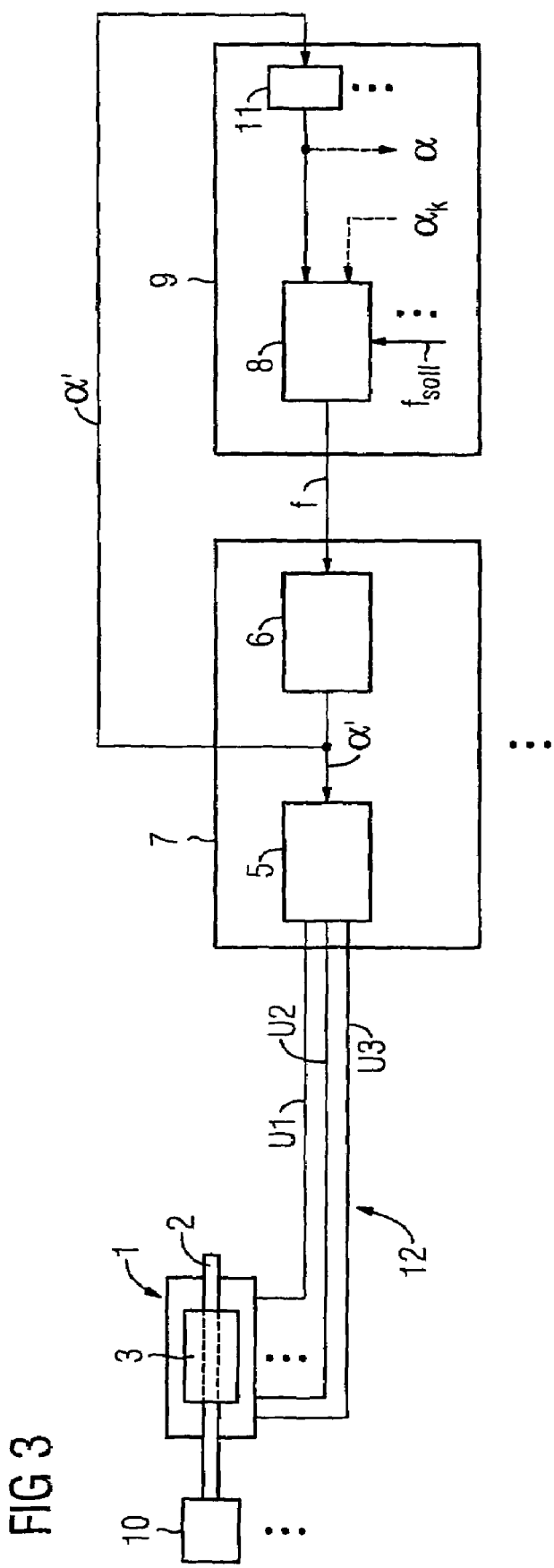

METHOD AND DRIVE SYSTEM FOR OPERATING A SYNCHRONOUS MOTOR

CROSS REFERENCE TO RELATED APPLICATIONS

This application claims priority of German application No. 10 2006 052 434.9 DE filed Nov. 7, 2006, which is incorporated by reference herein in its entirety.

FIELD OF INVENTION

The invention relates to a method and a drive for operating a synchronous motor.

BACKGROUND OF INVENTION

In particular, machine tools, production machines, transportation machines and/or handling machines are frequently powered by means of electrical synchronous motors. In such applications the machines have a number of driving axles, which are each powered by means of an appropriate synchronous motor.

Operation of such a machine generally requires the positions of the rotors of the synchronous motors and thus the mechanical angle of rotation of the motor shafts to be synchronized with one another so as to synchronize the driving of the different belts used for transporting a product in a transportation machine for instance.

FIG. 1 shows a drive system generally known from the prior art for operating a synchronous motor 1. The synchronous motor 1 has a motor shaft 2, which is connected to a rotor 3 of the synchronous motor 1 in a torque-proof manner. The motor shaft 2 powers a load 10, which can be present in the form of a drive roller for powering a conveyor belt for instance. A position sensor 4, which is connected to the motor shaft 2, measures the position $\alpha$ of the rotor 3, i.e. in the case of a rotatory synchronous motor, the mechanical angle of rotation $\alpha$ of the rotor 3, which corresponds with the angle of rotation of the motor shaft 2. The position $\alpha$ of the rotor 3 thus determined is usually fed to a closed-loop control device 8 as an input variable. By deriving the position $\alpha$ according to the time t and dividing by the value $2\pi$, the closed-loop control device 8 calculates an actual speed value and subtracts this from a predetermined speed set point $f_{soll}$. The difference thus determined is then fed to a proportional integral controller as an input variable for instance, within the closed-loop control device 8, said input variable outputting a speed f as an output variable. The speed f determined in such a manner by the closed-loop control device 8 is usually fed to a rotation angle determination unit 6 as an input variable, which calculates an electrical angle of rotation $\alpha'$ of a voltage vector according to the equation:

$$\alpha'(t) = \int_{t=t_0}^{t} 2\pi f(t) dt + \alpha'(t_0),$$

t: time
$t_0$: starting time
with a modulo calculation for restricting the angle $\alpha'$ to the value range $-\pi < \alpha' \leq \pi$ when $\alpha' < -\pi$, then $\alpha' := \alpha' + 2\pi$ and
when $\alpha' > \pi$, then $\alpha' := \alpha' - 2\pi$ additionally being carried out. The electrical angle of rotation $\alpha'$ of the voltage vector 13 is shown here in FIG. 2. The electrical angle of rotation $\alpha'$ determined in such a way is fed to a converter unit 5 as an input variable, which generates the three output voltages U1, U2, U3 for activating the synchronous motor 1 from the electrical angle of rotation $\alpha'$ with the aid of an integrated converter. To this end, the converter unit 5 is connected on the output side to the synchronous motor via lines 12.

In general, the converter unit 5 and the rotation angle determination unit 6 are usually integrated within a driving facility 7, which can take the form of a SINAMICS S120 for instance, developed by Siemens. The closed-loop control device 8 usually forms part of a computing apparatus 9, which can generally be present in the form of a numerical open-loop and/or closed-loop control, such as for instance a SIMOTION D4X5, developed by Siemens. The position sensor 4, the closed-loop control device 8, the rotation angle determination unit 6, the converter 5 and the synchronous motor 1 form a closed loop position control system for controlling the position $\alpha$ of the rotor 3 of the synchronous motor 1 and thus for controlling the mechanical angle of rotation of the motor shaft 2.

For reasons of clarity, FIG. 1 only shows one such individual closed loop position control system. A number of synchronous motors are generally present in a conventional machine, said synchronous motors being activated by means of a respectively assigned driving facility 7 and a respectively assigned closed-loop control device 8. The closed-loop control device 8, driving facility 7, synchronous motor 1, position sensor 4 and the load 10 are thus repeatedly present in a conventional machine, this being indicated by corresponding points in FIG. 1, with only one individual computing apparatus 9 comprising a number of closed-loop control devices, generally being present. In the case of a machine having a number of driving axles, the rotor positions $\alpha_k$ of the other synchronous motors are fed to the closed-loop control device 8 in order to synchronize the position of the rotor 3 of the synchronous motor 1 and the position $\alpha$ of the rotor of the synchronous motor is routed to the other closed-loop control devices within the computing apparatus 9, this being shown with a dashed line in FIG. 1.

As already noted at the start, the elements and functionalities shown in FIGS. 1 and 2 are generally known from the prior art and to the person skilled in the art.

One disadvantage of this drive system known from the prior art for operating synchronous motors is that a physically present position sensor, which determines the position $\alpha$ of the rotor of the synchronous motor, must be present in order to operate the synchronous motor. On the one hand, such a position sensor is expensive and on the other hand constitutes a fault source in the event of a malfunction of the position sensor.

SUMMARY OF INVENTION

An object of the invention is to specify a method and a drive system for operating a synchronous motor, in which a position sensor is not required.

This object is achieved by a method for operating a synchronous motor having the following method steps:
  determining an electrical angle of rotation on the basis of a speed, with the synchronous motor being controlled according to the electrical angle of rotation,
  determining a position of a rotor of the synchronous motor on the basis of the electrical angle of rotation and
  defining the speed on the basis of the position of the rotor.

This object is further achieved by a drive system for operating a synchronous motor, comprising,
- a rotation angle determination unit for determining an electrical angle of rotation on the basis of a speed,
- a converter for controlling the synchronous motor according to the electrical angle of rotation,
- a rotor position determination unit for determining a position of a rotor of the synchronous motor on the basis of the electrical angle of rotation and
- a closed-loop control device for determining the speed on the basis of the position of the rotor.

In particular, the invention allows the synchronization of driving axles of a machine, without position sensors being required for this function.

Advantageous embodiments of the invention result from the dependent claims.

Advantageous embodiments of the method likewise result in an advantageous embodiment of the drive system and vice versa.

It has proven advantageous for the converter unit and the rotation angle determination unit to be integral parts of a driving facility, with the driving facility being able to be connected to the synchronous motor and a computing apparatus, as the converter unit and the rotation angle determination unit are conventional parts of a driving facility.

It has further proven advantageous for the closed-loop control device and the rotor position determination unit to be integral parts of the computing apparatus, because no significant changes to the driving facility are then necessary in order to implement the invention.

It has further proven advantageous for the closed-loop control device to be an integral part of the computing apparatus and the rotor position determination unit to be an integral part of the driving facility, as an additional rotor position determination unit no longer needs to be integrated within a conventionally configured computing apparatus.

It has further proven advantageous to embody a machine tool, production machine, transportation machine and/or a handling machine with the inventive drive system, as with these types of machines, synchronous motors frequently have to be operated in a position-controlled manner. The invention can naturally also be used with other machines.

BRIEF DESCRIPTION OF THE DRAWINGS

One exemplary embodiment of the invention is shown in the drawing and is described in more detail below, in which;

FIG. 2 shows an electrical angle of rotation $\alpha'$ of a voltage vector 11 according to the prior art and FIG. 3 shows an inventive drive system.

DETAILED DESCRIPTION OF INVENTION

Figure 1:
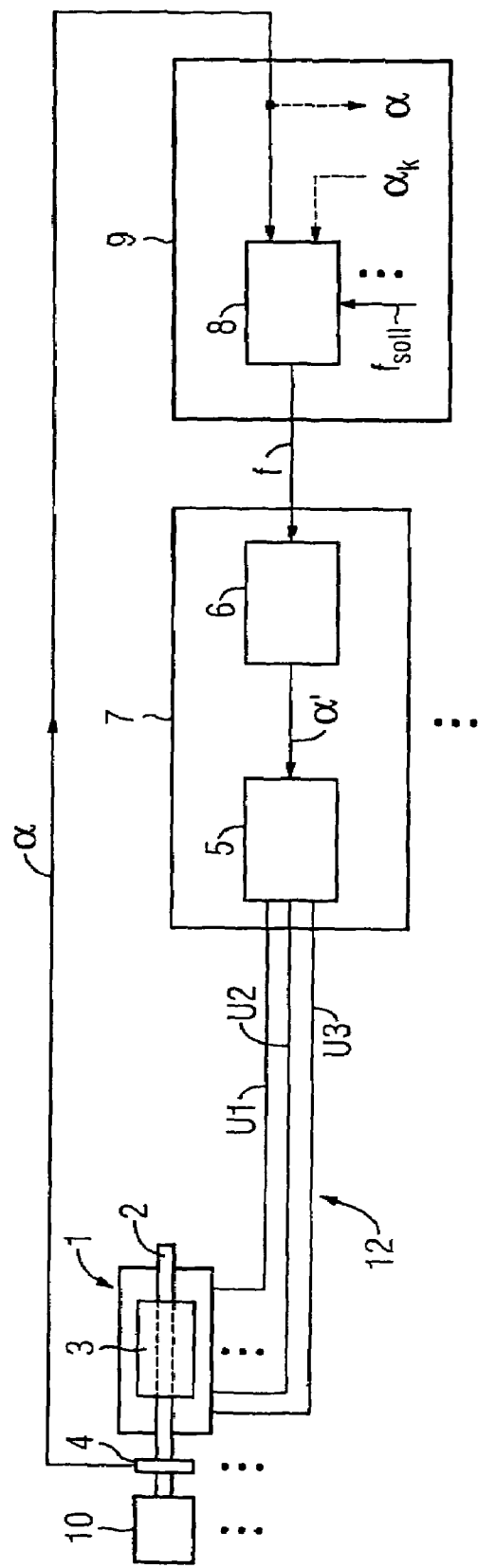
FIG. 1 shows a drive system for operating a synchronous motor according to the prior art.
Figure 2:
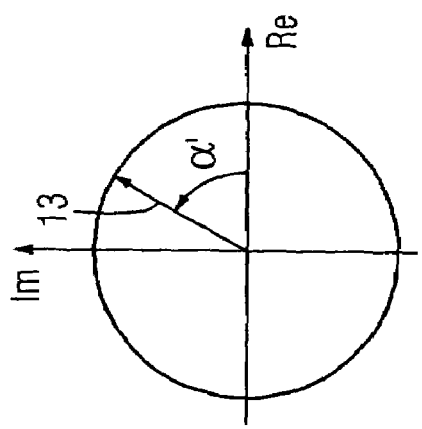

FIG. 3 shows a block diagram of the inventive drive system. The drive system shown in FIG. 3 essentially corresponds to the basic set-up of the drive system in FIG. 1, known previously from the prior art. Identical elements are thus provided in FIG. 3 with the same reference characters as in FIG. 1. The essential difference of the inventive drive system according to FIG. 3 compared with the drive system according to FIG. 1 is that the drive system according to FIG. 3 no longer comprises a physically present position sensor, but instead that the position $\alpha$ of the rotor 3 is determined from the electrical angle of rotation $\alpha'$ which is readily available within the driving facility 7.

To this end, within the scope of the exemplary embodiment, the computing apparatus 9 additionally comprises a rotor position determination unit 11 compared with the prior art. The rotor position determination unit 11 calculates the position a of the rotor 3 of the synchronous motor 1 from the electrical angle of rotation $\alpha'$ in accordance with the equation:

$$\alpha(t) = \frac{\alpha'(t)}{p} + \alpha(t_0)$$

p: number of pole pairs of the synchronous motor
t: time
$t_0$: starting point

A modulo calculation is likewise used here to restrict the position $\alpha$ to $-\pi < \alpha \leq \pi$.
if $\alpha < -\pi$, then $\alpha := \alpha + 2\pi$
if $\alpha > \pi$, then $\alpha := \alpha - 2\pi$ The electrical angle of rotation $\alpha'$ is fed from the driving facility 7, in particular from the angle of rotation determination unit 6 to the rotation position determination unit 11 as an input variable. Alternatively, instead of within the computation facility 9, the rotor position determination unit 11 can also be an integral part of the driving facility 7, with, in this case, the position $\alpha$ of the rotor 3 of the synchronous motor 1 being fed directly to the closed-loop control device 8 as an input variable by the driving facility 7.

The invention can be used both in a drive system for operating only one individual synchronous motor as well as in a drive system for operating a number of synchronous motors.

If however a number of synchronous motors are to be operated, the methods can be with the inventive drive system such that with two synchronous motors for example, the positions of the rotors of the respective synchronous motors are determined with the aid of position sensors, whilst the positions of the other synchronous motors which are to be operated are determined by means of the respective electrical angle of rotation $\alpha'$. Synchronous motors can thus be operated with and without position sensors, in particular in synchrony with one another. So, a first and a further synchronous motor can be provided, wherein the further synchronous motor has a further rotor operated by a position sensor that determines the position of the further rotor, and wherein the first synchronous motor is operated by the determined electrical rotation angle to determine the position of the first rotor, wherein the position data of the rotors are used for synchronizing the synchronous motors.

The invention claimed is:

1. A method for operating a first synchronous motor having stator windings used to generate electrical poles and having a first rotor, comprising:
   providing a driving facility, having a first unit that determines an electrical rotation angle based upon a revolution speed of the first rotor, the electrical angle of rotation dependent upon the number of electrical poles, and a converter unit that controls the first synchronous motor according to the electrical rotation angle;
   a computing apparatus separated from the driving facility, wherein an output value for a speed is transmitted from the computing apparatus to the driving facility, and wherein the computing unit has a closed-loop control unit that determines the revolution speed based upon the portion of the first rotor;
   determining an electrical angle of rotation based upon a revolution speed of the first rotor, the electrical angle of rotation dependent upon the number of electrical poles;

controlling the first synchronous motor based upon the electrical angle of rotation;

determining a position of the first rotor based upon the electrical angle of rotation;

determining the revolution speed based upon the position of the first rotor;

providing a further synchronous motor having a further rotor operated by a position sensor that determines the position of the further rotor, and wherein the first synchronous motor is operated by the determined electrical rotation angle to determine the position of the first rotor, wherein the position data of the rotors are used for synchronizing the synchronous motors.

2. A drive system for operating a synchronous motor having stator windings to enforce electrical poles and having a rotor comprising:

a driving facility, having a first unit that determines an electrical rotation angle based upon a revolution speed of the rotor, the electrical angle of rotation dependent upon the number of electrical poles, and a converter unit that controls the synchronous motor according to the electrical rotation angle;

a second unit that determines a position of the rotor based upon the electrical angle of rotation; and a computing apparatus separated from the driving facility, wherein an output value for a speed is transmitted from the computing apparatus to the driving facility, and wherein the computing unit has a closed-loop control unit that determines the revolution speed based upon the position of the rotor; and a further synchronous motor having a further rotor operated by using a position sensor to determine the position of the further rotor and the synchronous motor without a position sensor, operated by using the determined electrical rotation angle to determine the position of the rotor.

3. The drive system as claimed in claim 2, further comprises a driving unit, wherein the converter unit and the first unit are integrated in the driving unit.

4. The drive system as claimed in claim 3, wherein the driving unit is physically connected to the synchronous motor and to a computing apparatus.

5. The drive system as claimed in claim 2, wherein the closed-loop control unit is integrated in a computing apparatus.

6. The drive system as claimed in claim 5, wherein the second unit is integrated in the computing apparatus.

7. The drive system as claimed in claim 3, wherein the second unit is integrated in the driving unit.

8. The drive system as claimed in claim 2, synchronized by using the positions of both rotors.

* * * * *